US012756044B2

(12) United States Patent
Yao et al.

(10) Patent No.: US 12,756,044 B2
(45) Date of Patent: Oct. 6, 2026

(54) HOUSING OF BATTERY, BATTERY, POWER CONSUMPTION APPARATUS, AND METHOD AND APPARATUS FOR PRODUCING HOUSING

(71) Applicant: CONTEMPORARY AMPEREX TECHNOLOGY (HONG KONG) LIMITED, Hong Kong (CN)

(72) Inventors: Pengcheng Yao, Ningde City (CN); Peng Wang, Ningde City (CN); Xingdi Chen, Ningde City (CN); Yong Wang, Ningde City (CN); Youxin Wu, Ningde City (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 1001 days.

(21) Appl. No.: 17/564,863

(22) Filed: Dec. 29, 2021

(65) Prior Publication Data

US 2022/0209346 A1 Jun. 30, 2022

Related U.S. Application Data

(63) Continuation of application No. PCT/CN2020/139570, filed on Dec. 25, 2020.

(51) Int. Cl.
*H01M 50/204* (2021.01)
*H01M 10/0525* (2010.01)
(Continued)

(52) U.S. Cl.
CPC ..... *H01M 50/204* (2021.01); *H01M 10/0525* (2013.01); *H01M 50/249* (2021.01); *H01M 50/262* (2021.01); *H01M 2220/20* (2013.01)

(58) Field of Classification Search
CPC ...................... H01M 10/0525; H01M 2220/20
See application file for complete search history.

(56) References Cited

U.S. PATENT DOCUMENTS

2014/0014428 A1 1/2014 Yanagi
2018/0050607 A1 2/2018 Matecki et al.
(Continued)

FOREIGN PATENT DOCUMENTS

CN 202574385 U 12/2012
CN 105235755 A 1/2016
(Continued)

OTHER PUBLICATIONS

CN110611064A Machine translation (Year: 2019).*
(Continued)

*Primary Examiner* — Jonathan G Leong
*Assistant Examiner* — Aryana Y. Ortiz
(74) *Attorney, Agent, or Firm* — Scully, Scott, Murphy & Presser, P.C.

(57) ABSTRACT

Embodiments of the present application provide a housing of a battery, a battery, a power consumption device, and a method and apparatus for producing a housing. The housing of the battery includes: a plurality of walls, configured to form an accommodating space of the housing; a first beam, provided in the accommodating space, the first beam intersecting with a first wall of the plurality of walls, and the first beam having a first cavity inside; and a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam, and the strength of the housing could be enhanced.

15 Claims, 6 Drawing Sheets

(51) Int. Cl.

| | |
|---|---|
| ***H01M 50/249*** | (2021.01) |
| ***H01M 50/262*** | (2021.01) |

(56) References Cited

U.S. PATENT DOCUMENTS

| | | | | |
|---|---|---|---|---|
| 2020/0207221 | A1 | 7/2020 | Matecki et al. | |
| 2020/0212525 | A1 | 7/2020 | Ogino et al. | |
| 2021/0020877 | A1 | 1/2021 | Chen | |
| 2021/0320368 | A1* | 10/2021 | Huang | H01M 50/242 |
| 2022/0194201 | A1 | 6/2022 | Matecki et al. | |

FOREIGN PATENT DOCUMENTS

| | | | | | |
|---|---|---|---|---|---|
| CN | 106711368 | A | | 5/2017 | |
| CN | 108461685 | A | | 8/2018 | |
| CN | 109768200 | A | | 5/2019 | |
| CN | 209087957 | U | * | 9/2019 | H01M 10/0481 |
| CN | 110611064 | A | * | 12/2019 | H01M 50/20 |
| CN | 210110876 | U | | 2/2020 | |
| CN | 210467949 | U | | 5/2020 | |
| CN | 211828886 | U | | 10/2020 | |
| EP | 2685523 | A1 | | 1/2014 | |
| JP | 2008240479 | A | * | 10/2008 | |

OTHER PUBLICATIONS

CN108461685A Machine translation (Year: 2018).*

CN105235755A Machine translation (Year: 2016).*

JP2008240479A_Machine translation (Year: 2008).*

International Search Report and Written opinion dated Sep. 26, 2021 received in International Application No. PCT/CN2020/139570.

Extended European Search report dated Sep. 5, 2022 received in European Patent Application No. EP 20937172.3.

* cited by examiner

HOUSING OF BATTERY, BATTERY, POWER CONSUMPTION APPARATUS, AND METHOD AND APPARATUS FOR PRODUCING HOUSING

CROSS-REFERENCE TO RELATED APPLICATIONS

This application is a continuation of International Application No. PCT/CN2020/139570, filed on Dec. 25, 2020, the disclosure of which is hereby incorporated by reference in its entirety.

TECHNICAL FIELD

The present application relates to the field of battery technologies, and in particular, to a housing of a battery, a battery, a power consumption apparatus, and a method and apparatus for producing a housing.

BACKGROUND

A housing of a battery pack is a carrier of all components, and its structural strength and sealing performance are particularly important. At present, a bottom plate, a beam and a wall or other portions included in the housing are produced by lap welding. However, a welding seam between the wall and the beam of the housing is prone to stress concentration, and a strength of the welding seam is low, which leads to a risk of failure and is unable to meet the strength requirements of the housing.

SUMMARY

The present application provides a housing of a battery, a battery, a power consumption apparatus, and a method and apparatus for producing a housing, which could enhance a strength of the housing.

According to a first aspect, a housing of a battery is provided, a plurality of walls, configured to form an accommodating space of the housing, the plurality of walls including a first wall; a first beam, provided in the accommodating space, the first beam intersecting with the first wall, and the first beam having a first cavity inside; and a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam.

Therefore, in a housing of a battery according to an embodiment of the present application, a first reinforcing structure is at least partially accommodated in a cavity of a first beam, to fix a first beam to a first wall, and the rigidity and strength between the first beam and the first wall could be greatly increased without occupying an internal space of the housing or by occupying a very small space, which can solve the problem of easy failure of a welding seam that is subject to an expansion force due to the low strength of the welding seam when the first beam and the first wall are fixed by welding.

In some embodiments, the first beam includes two outer side walls and a first connecting wall connecting the two outer side walls, and the two outer side walls and the first connecting wall form a plurality of first cavities.

It should be understood that in an embodiment of the present application, the interior of the first beam may include one or more first cavities, and when a plurality of first cavities are included, shapes and sizes of the plurality of first cavities may be set according to practical applications, for example, the sizes of the plurality of first cavities may be different; and for another example, the shapes of the plurality of first cavities may be the same to facilitate processing.

In some embodiments, the first reinforcing structure includes a plurality of reinforcing blocks, each of the plurality of reinforcing blocks is accommodated in a corresponding first cavity of the plurality of first cavities.

In an embodiment of the present application, one or more reinforcing blocks may be accommodated in one first cavity, and if only one reinforcing block is accommodated in one cavity, a size and shape of an accommodated reinforcing block are consistent with those of the corresponding first cavity, to facilitate processing and installation.

In some embodiments, the first connector includes a plurality of fasteners arranged in a first direction, and the first direction is a length direction of the first beam.

In some embodiments, the first reinforcing structure includes a plurality of reinforcing blocks, the first connector includes a fastener, the fastener includes a connecting part and a head, the connecting part of the fastener penetrates at least one of the plurality of reinforcing blocks in a second direction, and the second direction is a height direction of the first beam.

In order to ensure the strength among the fastener, the first reinforcing structure, and the first beam, a length of each fastener in a second direction is generally set to account for more than half of a height of the first reinforcing structure in the second direction.

In some embodiments, a recess is provided on an outer top wall of the first beam, and the head of the fastener is located in the recess, so that the head of the fastener does not exceed a maximum height of the first beam in the height direction of the first beam.

The height of the head of the fastener does not exceed the maximum height of the first beam, which may not affect the installation of various components in the housing. For example, if the housing includes a main body part and a cover part, the main body part is a hollow cuboid with an opening at one end, and the cover part is in a plate shape to cover the opening of the main body part, the head of the fastener is provided in a recess and the height of the head of the fastener does not exceed the maximum height of the first beam, which does not affect the installation of the cover part, and ensures closure of the main body part with the cover part.

In some embodiments, the housing further includes a second reinforcing structure, the second reinforcing structure includes a first portion and a second portion that are connected, the first portion is fixed to a surface of the first wall toward the first beam, the second portion is fixed to the outer top wall of the first beam, and the fastener penetrates the second portion.

The second reinforcing structure is closely attached to the first beam and the first wall at the same time, which could prevent the first beam from tilting up in the height direction as much as possible. Furthermore, the head of the fastener is provided on the second reinforcing structure, which could effectively avoid the problem of stress concentration between the fastener and the first beam, and improve the stability.

In some embodiments, the first connector includes an expansion adhesive, and the expansion adhesive is located between the first reinforcing structure and the first beam, to connect the first reinforcing structure and the first beam.

Optionally, the expansion adhesive may be added between at least one side wall of the first beam and the first reinforcing structure, so that the first reinforcing structure and the expansion adhesive may fill a gap between two side walls of the first beam.

In some embodiments, the first wall includes an inner sub-wall, an outer sub-wall, and a second connecting wall for connecting the inner sub-wall and the outer sub-wall, the inner sub-wall is an inner wall of the housing, the outer sub-wall is an outer wall of the housing, and the inner sub-wall, the outer sub-wall, and the second connecting wall form a second cavity of the first wall.

The interior of the first wall may have one or more second cavities, and if there are a plurality of second cavities, shapes and sizes of the plurality of second cavities may be set according to practical applications, for example, the sizes of the plurality of second cavities may be different; and for another example, the shapes of the plurality of second cavities may be the same to facilitate processing.

In some embodiments, the first reinforcing structure includes a fixing part and an insertion part, the insertion part is accommodated in the first cavity, the fixing part is located outside the first cavity, and the fixing part is fixed to the first wall through the second connector, so that the first reinforcing structure is fixed to the first wall.

For example, the fixing part may be in a thin plate shape, and the fixing part is fixed to the inner sub-wall of the first wall by a second connector, for example, the second connector may be a fastener such as a bolt, a screw or a rivet, and the second connector sequentially penetrates the fixing part and the inner sub-wall of the first wall to facilitate installation.

In some embodiments, the fixing part is accommodated in the second cavity.

In some embodiments, the inner sub-wall is provided with a first opening, and the first opening is configured to accommodate the fixing part in the second cavity.

If the fixing part is directly fixed to the inner sub-wall of the first wall, part of the space inside the housing is still occupied, which reduces the space utilization rate. Therefore, the fixing part may be accommodated in the second cavity of the first wall by opening the inner sub-wall of the first wall, so as to achieve the purpose of not occupying the inner space of the housing.

For example, the fixing part may be fixed to a surface of the outer sub-wall toward the inner sub-wall, or the fixing part may be fixed to an intermediate wall between the inner sub-wall and the outer sub-wall, specifically, it may be fixed to a surface of the intermediate wall toward the inner sub-wall, and the intermediate wall may be parallel to the inner sub-wall or the outer sub-wall.

In some embodiments, the housing further includes: a third reinforcing structure, provided in the second cavity, the third reinforcing structure being fixed to the first wall and the first reinforcing structure through the second connector.

For example, the third reinforcing structure may be fixed to a surface of the inner sub-wall toward the outer sub-wall, or the third reinforcing structure may be fixed to a surface of the intermediate wall toward the outer sub-wall.

In some embodiments, the outer sub-wall is provided with a second opening, and the second opening is configured to install the second connector.

The second connector, the intermediate wall, and the fixing part may be fixed through the second opening of the outer sub-wall.

Alternatively, the third reinforcing structure may be accommodated in the second cavity of the first wall through the second opening of the outer sub-wall, and the second connector, the third reinforcing structure, and the first reinforcing structure may be fixed through the second opening.

In some embodiments, the first wall further includes a sealing plate, and the sealing plate is hermetically connected to the second opening.

In some embodiments, the housing includes a main body part and a cover part, the main body part is a hollow structure with an opening at one end, and the cover part is configured to cover the opening of the main body part to form a closed chamber, and the first wall is any wall of the main body part.

Optionally, the housing may also include a cover part and a main body part, the cover part and the main body part both are hollow structures with an opening at one end, an opening of the cover part is disposed opposite to an opening of the main body part, and the cover part and the main body part are fastened to each other to form a closed chamber. The first wall may be any wall of the cover part and the main body part.

In a second aspect, a battery is provided, including a plurality of battery cells; and the housing of the battery according to the first aspect or any one of the embodiments of the first aspect, where the plurality of battery cells are accommodated in the housing.

In a third aspect, a power consumption apparatus is provided, including: the battery according to the second aspect.

In a fourth aspect, a method of producing a housing of a battery is provided, including: providing a plurality of walls, the plurality of walls being configured to form an accommodating space of the housing, and the plurality of walls including a first wall; providing a first beam, the first beam being provided in the accommodating space, the first beam intersecting with the first wall, and the first beam having a first cavity inside; and providing a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam.

In some embodiments, the first connector includes an expansion adhesive, and the method further includes: coating the expansion adhesive on at least part of an outer surface of the first reinforcing structure; and accommodating, in the first cavity, a portion of the first reinforcing structure coated with the expansion adhesive, and heating an accommodated portion, so that the first reinforcing structure is connected to the first beam after expansion of the expansion adhesive occurs.

In a fifth aspect, an apparatus for producing a battery is provided, including a module for executing the foregoing fourth aspect or any one of the embodiments of the fourth aspect.

DESCRIPTION OF EMBODIMENTS

Figure 1:
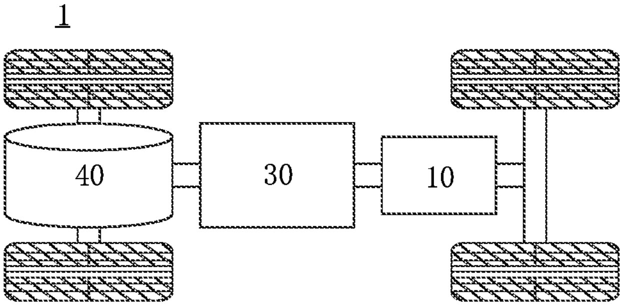
FIG. 1 is a schematic structural diagram of a vehicle disclosed in an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

In the description of the present application, it should be noted that, unless otherwise provided, “a plurality of” means more than two; and orientations or positional relationships indicated by terms such as “up”, “down”, “left”, “right”, “inside”, and “outside” are merely for convenience of describing the present application and for simplifying the description, rather than for indicating or implying that an apparatus or element indicated must have a specific orientation, and must be constructed and operated in a specific orientation, which thus may not be understood as limitation to the present application. In addition, the terms “first”, “second”, and “third” are only intended for the purpose of description, and shall not be understood as an indication or implication of relative importance. “Vertical” is not strictly vertical, but within an allowable range of error. “Parallel” is not strictly parallel, but within an allowable range of error.

The orientation words appearing in the following description are all directions shown in the drawings, and do not limit the specific structure of the present application. In the description of the present application, it should be further noted that, unless explicitly specified and defined otherwise, terms “installation”, “interconnection”, “connection” and “attachment” should be understood broadly, for example, they may either be a fixed connection, or a detachable connection, or an integrated connection; and they may either be a direct connection, or an indirect connection through an intermediary. Those of ordinary skill in the art may understand the specific meanings of the foregoing terms in the present application according to specific conditions.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms “comprising” and “having” and any variations thereof in the specification and the claims of the present application as well as the foregoing description of the accompanying drawings are intended to cover non-exclusive inclusions. The terms “first”, “second” and the like in the specification and the claims of the present application as well as the above drawings are used to distinguish different objects, rather than to describe a specific order or primary-secondary relationship.

The phrase “embodiments” referred to in the present application means that the descriptions of specific features, structures, and characteristics in combination with the embodiments are included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that unless otherwise explicitly specified and defined, the terms “mounting”, “connecting”, “connection” and “attaching” should be understood in a broad sense, for example, they may be a fixed connection, a detachable connection, or an integrated connection; may be a direct connection and may also be an indirect connection via an intermediate medium, or may be communication between the interiors of two elements. A person of ordinary skill in the art may understand the specific meanings of the foregoing terms in the present application according to specific circumstances.

In the present application, the term “and/or” is only an association relation describing associated objects, which means that there may be three relations, for example, A and/or B may represent three situations: A exists alone, both A and B exist, and B exists alone. In addition, the character “/” in the present application generally indicates that the associated objects before and after the character are in an “or” relation.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiment of the present application. The battery cells may be cylindrical, flat, cuboid or in another shape, which is not limited by the embodiment of the present application. The battery cells are generally divided into three types according to the way of packaging: cylindrical battery cells, prismatic battery cells and pouch battery cells, which is not limited by the embodiment of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a housing for enclosing one or more battery cells. The housing may prevent a liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. Taking a lithium-ion battery as an example, the material of the positive electrode current collector may be aluminum, and the positive active material may be lithium cobalt oxides, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may have a winding structure or a laminated structure, and the embodiments of the present application are not limited thereto.

The housing of the battery in the embodiment of the present application is configured to accommodate a plurality of battery cells, a bus component and other components of the battery. In some embodiments, a structure configured to fix the battery cells may also be provided in the housing. The shape of the housing may be determined according to the plurality of battery cells accommodated therein. In some embodiments, the housing may be a cube with six walls.

The bus component mentioned in the present application is configured to implement the electrical connection between the plurality of battery cells, such as parallel connection, series connection or series-parallel connection. The bus component may implement the electrical connection between the battery cells by connecting electrode terminals of the battery cells. In some embodiments, the bus component may be fixed to the electrode terminals of the battery cells by means of welding.

It should be understood that each component in the housing of the battery described above should not be construed as a limitation of the embodiment of the present application, that is, the housing of the battery according to the embodiment of the present application may or may not include the foregoing components.

The technical solutions described in the embodiments of the present application are all applicable to various devices using batteries, such as mobile phones, portable apparatuses, notebook computers, electromobiles, electronic toys, electric tools, vehicles, ships and spacecrafts. For example, the spacecrafts include airplanes, rockets, space shuttles, spaceships, etc.

It should be understood that the technical solutions described in the embodiments of the present application are not only applicable to the foregoing devices, but also applicable to all devices using batteries. However, for the sake of brevity, the following embodiments take vehicles as an example for description.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running In another embodiment of the present application, the battery 10 may be used not only as an operating power source for the vehicle 1 but also as a driving power source for the vehicle 1, replacing or partially replacing fuel or natural gas to provide driving power for the vehicle 1.

Figure 2:
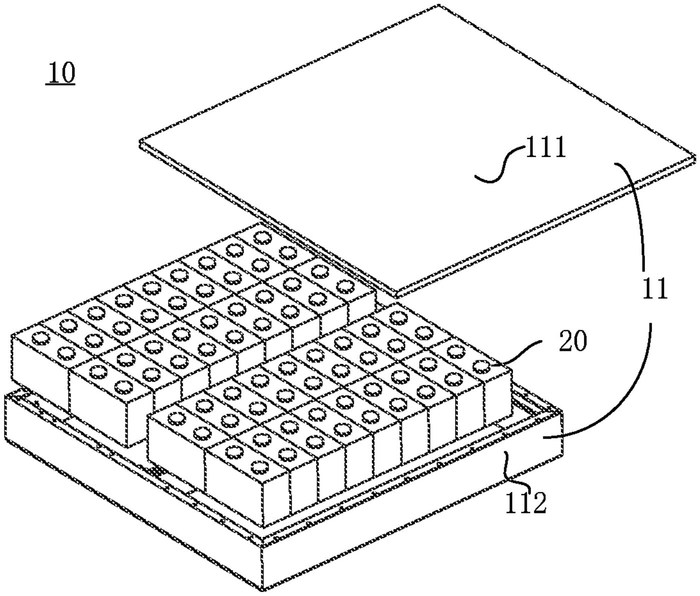
FIG. 2 is an exploded structural diagram of a battery disclosed in an embodiment of the present application.

In order to meet different power requirements, the battery 10 may include a plurality of battery cells. For example, FIG. 2 is an exploded structural diagram of a battery 10 according to an embodiment of the present application, and the battery 10 may include a plurality of battery cells 20. According to different power requirements, the number of the battery cells 20 may be set to any value. The plurality of battery cells 20 can be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. The battery may include a plurality of battery modules, and these battery modules may be connected in series, in parallel or in series and parallel.

Optionally, the battery 10 may also include other structures. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the housing. Optionally, the electrically conductive mechanism may also belong to the bus component.

The battery 10 may further include a housing 11 (or referred to as a covering) with the interior thereof being a hollow structure, and the plurality of battery cells 20 are accommodated in the housing 11. As shown in FIG. 2, the housing may include two portions, which are referred to as a cover part 111 and a main body part 112 (or referred to as an upper housing and a lower housing), respectively, and the cover part 111 and the main body part 112 are fastened together. Shapes of the cover part 111 and the main body part 112 may be determined according to a shape of combined plurality of battery cells 20, and at least one of the cover part 111 and the main body part 112 has an opening. For example, only one of the cover part 111 and the main body part 112 included in the housing 11 may be a hollow cuboid with an opening, and the other one may be in a plate shape to cover the opening. For example, as shown in FIG. 2, in an example that the main body part 112 is a hollow cuboid and has only one face as an opening face and the cover part 111 is in a plate shape, the opening of the main body part 112 is covered by the cover part 111 to form the housing 11 with a closed chamber, and the chamber may be configured to accommodate a plurality of battery cells 20.

Optionally, the cover part 111 and the main body part 112 included in the housing 11 in the embodiment of the present application may also have other shapes, for example, the cover part 111 and the main body part 112 each may be a hollow cuboid and each have only one face as an opening face, and the opening of the cover part 111 is disposed opposite to the opening of the main body part 112. The cover part 111 and the main body part 112 are fastened to each other to form a housing 11 with a closed chamber. The plurality of battery cells 20 are combined in parallel connection or series connection or series-parallel connection and are then placed in the housing formed by fastening the cover part 111 and the main body part 112.

For ease of description, the following description mainly takes the housing 11 shown in FIG. 2 as an example, but the embodiment of the present application is not limited thereto.

Figure 3:
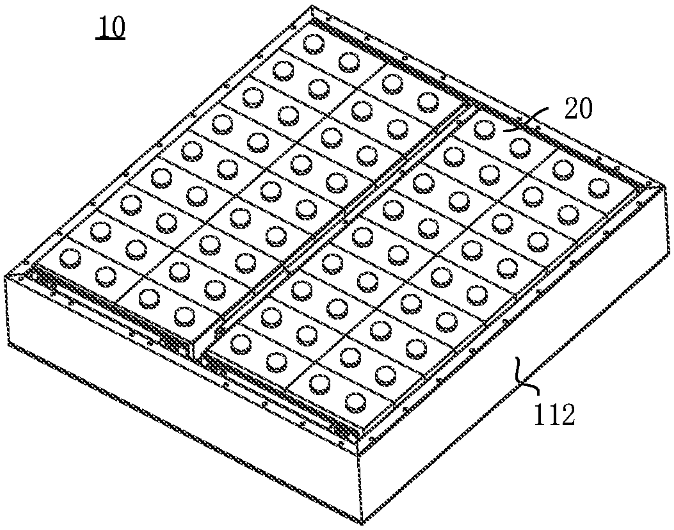
FIG. 3 is a schematic structural diagram of a battery disclosed in an embodiment of the present application.

FIG. 3 shows an installation diagram of the main body part 112 and the battery 20 in FIG. 2. As shown in FIG. 3, since the main body part 112 of the housing 11 is a carrier of various internal components, its structural strength and sealing performance are particularly important. At present, a bottom plate, a wall, or other portions included in the housing 11 are produced by lap welding. However, a welding seam between the walls or between the wall and the beam located inside is prone to stress concentration, and a strength of the welding seam is low, which leads to a risk of failure and is unable to meet the strength requirements of the housing 11. If the strength between the wall and the beam of the housing 11 is increased by adding a reinforcing bracket in the housing 11, the reinforcing bracket needs to occupy an internal space of the housing 11, which leads to a low utilization rate of the internal space of the housing 11 and affects the installation of the battery cell 20.

Therefore, an embodiment of the present application provides a housing of a battery, which could solve the foregoing problem.

Figure 4:
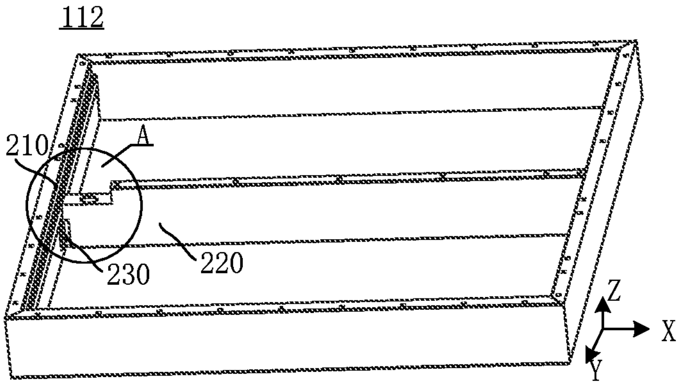
FIG. 4 is a schematic diagram of a main body part of a housing of a battery disclosed in an embodiment of the present application.
Figure 5:
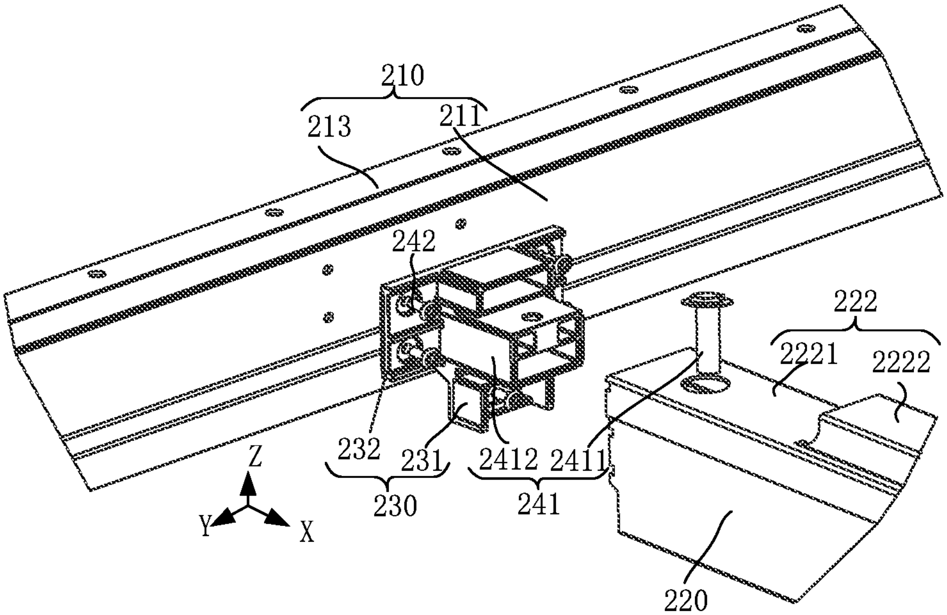
FIG. 5 is a partial exploded diagram of a housing of the battery disclosed in an embodiment of the present application.

FIG. 4 shows a schematic diagram of a main body part 112 of a housing 11 according to an embodiment of the present application, and FIG. 5 is an exploded diagram of a region A in the main body part 112 shown in FIG. 4. The main body part 112 in the embodiment of the present application may include a plurality of walls with a certain thickness to form a hollow structure of the main body part 112. For example, the main body part 112 in FIG. 4 includes four side walls and a bottom wall, forming a hollow cuboid. For ease of description, the following description takes a first wall 210 included in the main body part 112 as an example. The first wall 210 may be any wall of the main body 112 part, for example, as shown in FIG. 4, the first wall 210 may be any side wall of the main body part 112, but the embodiment of the present application is not limited thereto.

At least one beam is also provided inside the main body part 112, and each beam is connected to one or more walls of the main body part 112. For example, the number of beams may be determined according to the number of battery cells 20 carried in the main body part 112. If the number of battery cells 20 is large, a plurality of beams may be provided to ensure the strength of the housing 11, and if the number of battery cells 20 is small, one or a few beams may be provided. For example, as shown in FIGS. 4 and 5, a first beam 220 intersecting with a first wall 210 is taken as an example, and the first beam 220 may be any one of at least one beam included in the main body part 112.

Figure 6:
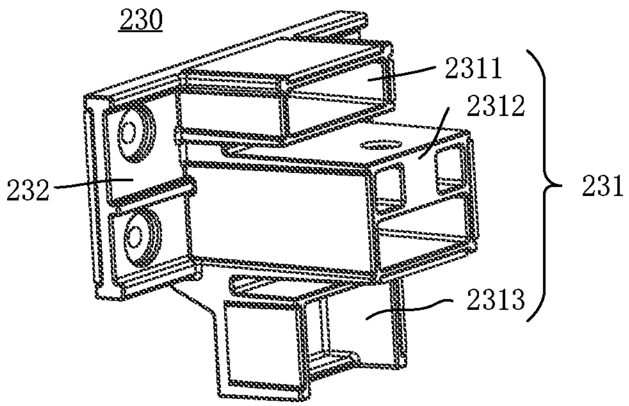
FIG. 6 is a schematic diagram of a first reinforcing structure disclosed in an embodiment of the present application.
Figure 7:
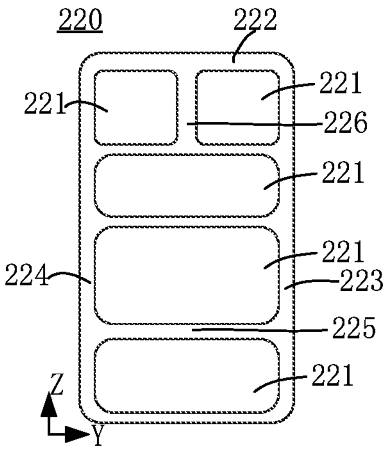
FIG. 7 is a schematic cross-sectional diagram of a first beam disclosed in an embodiment of the present application.

As shown in FIGS. 4 and 5, a reinforcing structure may also be provided at an intersection of the first wall 210 and the first beam 220, to fix the first wall 210 and the first beam 220 and increase the strength between the first wall 210 and the first beam 220. For example, FIGS. 4 and 5 take a first reinforcing structure 230 provided at an intersection of the first beam 220 and the first wall 210 as an example, and FIG. 6 shows a schematic diagram of the first reinforcing structure 230 in FIGS. 4 and 5, and FIG. 7 shows a schematic cross-sectional diagram of the first beam 220, which is obtained by cutting the first beam 220 along a plane parallel to the first wall 210. In addition, since the main body part 112 may have one or more first beams 220 inside, correspondingly there may be a plurality of intersecting positions between the first beam 220 and the first wall 210, and the first reinforcing structure 230 may be provided at all or part of the plurality of intersecting positions, for example, FIG. 4 only shows one of the intersecting positions, but the embodiment of the present application is not limited thereto.

As shown in FIGS. 4-7, the first beam 220 has a certain thickness and has a cavity inside, which is referred to as a first cavity 221 here. At least part of the first reinforcing structure 230 is accommodated in the first cavity 221, and the first reinforcing structure 230 is fixed to the first beam 220 through a first connector 241 and to the first wall 210 through a second connector 242, so that the first wall 210 and the first beam 220 are fixedly connected.

Therefore, in the housing 11 according to the embodiment of the present application, the first reinforcing structure 230 is provided in the cavity of the first beam 220, to fix the first beam 220 to the first wall 210, the rigidity and strength between the first beam 220 and the first wall 210 could be greatly increased without occupying an internal space of the housing 11 or by occupying a very small space, which can solve the problem of easy failure of the welding seam that is subject to an expansion force due to the low strength of the welding seam when the first beam 220 and the first wall 210 are fixed by welding.

As shown in FIGS. 4-7, in an embodiment of the present application, at least part of the first reinforcing structure 230 is accommodated in the first cavity 221. Specifically, the first beam 220 may include two outer side walls 223 and 224, and further include a first connecting wall 225 connecting the two outer side walls 223 and 224. A surface of each of the two outer side walls 223 and 224 of the first beam 220 may be flat or uneven, for example, a local region of an outer surface or inner surface of the outer side walls 223 and 224 may have a protrusion or a groove, or other components may be provided on an outer surface or inner surface thereof, and the embodiment of the present application is not limited thereto.

In addition, the two outer side walls 223 and 224 of the first beam 220 may be parallel to each other or approximately parallel, for example, the two opposite inner surfaces of the two outer side walls 223 and 224 may be parallel, but the embodiment of the present application is not limited thereto. For ease of description, in the present application, an example that two outer side walls 223 and 224 of the first beam 220 are two parallel walls may be taken as an example for description.

As shown in FIGS. 4-7, the first beam 220 also includes a first connecting wall 225 connecting the two outer side walls 223 and 224, where the first connecting wall 225 may be in any direction and at any position. For example, the first connecting wall 225 may include an outer top wall 222 of the first beam 220, the outer top wall 222 is an outer wall of the first wall 220 and is connected to end portions of the two side walls 223 and 224 at the same time. In addition, the first connecting wall 225 may also include a wall located inside the first beam 220. In addition, considering that the two outer side walls 223 and 224 are generally two parallel walls, the first connecting wall 225 is generally perpendicular to the two outer side walls 223 and 224 in order to facilitate processing and increase structural strength. Furthermore, a partition wall 226 parallel to the two outer side walls 223 and 224 may also be provided between the two first connecting walls 225 perpendicular to the two outer side walls 223 and 224, so that more first cavities 221 are formed inside the first beam 220, but the embodiment of the present application is not limited thereto. As shown in FIG. 7, the partition wall 226 may be connected to upper and lower first connecting walls 225, that is, the first connecting wall 225 in the embodiment of the present application may include the partition wall 226.

It should be understood that in the embodiment of the present application, the outer side walls 223 and 224 and the plurality of first connecting walls 225 included in the first beam 220 may be an integrally formed structure, or other manners may be adopted, and the embodiment of the present application is not limited thereto.

In the embodiment of the present application, the two outer side walls 223 and 224 and the first connecting walls 225 form a plurality of first cavities 221 inside the first beam 220, the plurality of first cavities 221 may be the same or different in size and shape, and the embodiment of the present application is not limited thereto. For example, in FIG. 7, the plurality of first cavities 221 being rectangles with rounded corners is taken as an example, but the sizes of the plurality of first cavities 221 are different. For another example, when the two outer side walls 223 and 224 are parallel and the first connecting wall 225 is perpendicular to the two outer side walls 223 and 224, axes of the plurality of first cavities 221 of the first beam 220 are parallel to each other.

It should be understood that corresponding to different first cavities 221, the first reinforcing structure 230 of the embodiment of the present application may also have different shapes and sizes. Specifically, as shown in FIGS. 4-7, the first reinforcing structure 230 in the embodiment of the present application may include a plurality of reinforcing blocks, for example, taking three reinforcing blocks 2311, 2312 and 2313 as an example, each of the reinforcing blocks 2311, 2312 and 2313 may be accommodated in one corresponding first cavity 221 among the plurality of first cavities 221 included inside the first beam 220.

As shown in FIGS. 5 and 6, the first reinforcing structure 230 may include an insertion part 231 that is accommodated in the first cavity 221, and the insertion part 231 may include a plurality of reinforcing blocks 2311, 2312 and 2313, where one reinforcing block is accommodated in one first cavity 221, but any one of the first cavities 221 in the first beam 220 may not accommodate the reinforcing block or accommodate one or more reinforcing blocks. Furthermore, each first cavity 221 extends in a length direction of the first beam 220 (i.e., the X direction in the figure), but a length of each reinforcing block may be less than or equal to a length of the first beam 220, that is, the reinforcing block may be located at one end of the first beam 220 close to the first wall 210, and the length of the reinforcing block may be set according to actual application. However, for a section of any reinforcing block along a plane perpendicular to the first beam 220 (or along a plane parallel to the first wall 210), the shape and size of the section are related to a first cavity 221 accommodating the reinforcing block. For example, as shown in FIGS. 4-7, if axes of the plurality of first cavities in the first beam 220 are parallel to each other, and at most one reinforcing block is provided in one first cavity, axes of the plurality of reinforcing blocks included in the insertion part 231 are also parallel.

Optionally, in an embodiment of the present application, the number of reinforcing blocks included in the first reinforcing structure 230 may correspondingly be set to any value. For example, taking FIG. 5 to FIG. 7 as an example, a height direction of the first beam 220 is defined as a second direction here, which is denoted as the Z direction, and the first beam includes four rows of first cavities 221 along the Z direction. Correspondingly, if one first cavity 221 accommodates at most one reinforcing block, the first reinforcing structure 230 may include at most four rows of reinforcing blocks, for example, in FIGS. 5 and 6, three reinforcing blocks 2311, 2312, and 2313 being included are taken as an example, or another number of reinforcing blocks may also be set.

It should be understood that any one of the reinforcing blocks 2311, 2312 and 2313 in the embodiment of the present application may be a solid block, so that the first reinforcing structure 230 has greater strength; or the plurality of reinforcing blocks 2311, 2312 and 2313 may be hollow structures with cavities, or other structures. For example, as shown in FIGS. 5 and 6, the reinforcing blocks 2311, 2312, and 2313 may be hollow cuboid structures with an opening at one end, and walls of the reinforcing blocks 2311, 2312, and 2313 have a certain thickness to ensure the strength of the first reinforcing structure 230.

In the embodiment of the present application, the first reinforcing structure 230 may be fixedly connected to the first beam 220 through the first connector 241. Optionally, the first connector 241 may include one or more fasteners 2411, and the fastener 2411 may include a head and a connecting part, for example, the fastener 2411 may be a bolt, a screw, a rivet, or the like, and the embodiment of the present application is not limited thereto.

It should be understood that the first reinforcing structure 230 shown in FIGS. 5 and 6 is taken as an example, the first reinforcing structure 230 includes three reinforcing blocks 2311, 2312 and 2313, and the fastener 2411 may penetrate an outer top wall 222 of the first beam 220 and at least one of the three reinforcing blocks 2311, 2312 and 2313, so that the first beam 220 is fixed to the first reinforcing structure 230. Specifically, as shown in FIGS. 4 to 7, a length direction of the first beam 220 is defined as a first direction here, which is denoted as the X direction. Along the X direction, lengths of the three reinforcing blocks 2311, 2312 and 2313 may be set to be different, and then different manners may be selected to fix the fastener 2411.

For example, as shown in FIGS. 4 to 7, a length of the middle reinforcing block 2312 may be set to be longer than lengths of the other two reinforcing blocks 2311 and 2313, and in this way, a through hole may be provided on the middle reinforcing block 2312, and at the same time, through holes may be provided on the outer top wall 222 of the first beam 220 and the first connecting wall 225 inside the first beam 220, and the connecting part of the fastener 2411 penetrates the first connecting wall 225 inside the first beam 220 and the middle reinforcing block 2312 through the through hole on the outer top wall 222 to realize the fixation of the first beam 220 and the first reinforcing structure 230. The head of the fastener 2411 may be located on an outer surface of the outer top wall 222, for example, as shown in FIGS. 4 and 5, an outer surface of the outer top wall 222 of the first beam 220 may have a recess, a lower surface of the outer top wall 222 of the first beam 220 is a surface 2221, and a higher surface thereof is a surface 2222. Then the head of the fastener 2411 may be provided on the lower surface 2221, so that a height of the head of the fastener 2411 may not exceed a maximum height of the first beam 220 in the Z direction, which will not affect the installation of various components in the housing 11. For example, when the cover part 111 corresponding to the main body part 112 is in a flat plate shape, the fastener 2411 does not protrude in height, which will not affect the closure of the cover part 111 with the main body part 112. Alternatively, the head of the fastener 2411 may be located in the cavity of the first beam 220. For example, the head of the fastener 2411 may be fixed to a surface of the first connecting wall 225 inside the first beam 220 through the through hole on the outer top wall 222. Thus, as shown in FIG. 4, after installation, the fastener 2411 is completely located inside the first beam 220, which does not affect an external structure of the first beam 220 at all, and facilitates the installation of other components.

Optionally, different from the structure shown in FIG. 5 or FIG. 6, the lengths of the plurality of reinforcing blocks of the first reinforcing structure 230 may also be set to other conditions. For example, lengths of upper two reinforcing blocks 2311 and 2312 may be set to be larger than the lowermost reinforcing block 2313, and the fastener 2411 may penetrate the upper two reinforcing blocks 2311 and 2312 to fix to the first beam 220, and the embodiment of the present application is not limited thereto, which will be described below with reference to the accompanying drawings.

It should be understood that the number of fasteners 2411 in the embodiment of the present application may be set according to the actual application. For example, one fastener 2411 is taken as an example in FIG. 5, or a plurality of fasteners 2411 may be provided, and the plurality of fasteners 2411 may be arranged along the X direction to ensure the strength and stability between the first beam 220 and the first reinforcing structure 230.

Optionally, the first connector 241 in an embodiment of the present application may further include an expansion adhesive 2412, and the expansion adhesive 2412 is located between the first reinforcing structure 230 and the first beam 220 to connect the first reinforcing structure 230 and the first beam 220. Specifically, as shown in FIGS. 4 to 7, a thickness direction of the first beam 220 is defined as a third direction, which is denoted as the Y direction. The expansion adhesive 2412 may be provided on a surface of a side wall of the first reinforcing structure 230, that is, the expansion adhesive 2412 may be provided between at least one of the two outer side walls 222 and 223 of the first beam 220 and the first reinforcing structure 230, so that in the Y direction, the first reinforcing structure 230 may fill the cavity inside the first beam 220 under the action of the expansion adhesive 2412. Alternatively, the expansion adhesive 2412 may be provided on other surfaces of the first reinforcing structure 230, and the embodiment of the present application is not limited thereto.

In an embodiment of the present application, when the first reinforcing structure 230 is installed, the expansion adhesive 2412 may be coated on a surface of the first reinforcing structure 230 first, for example, the expansion adhesive 2412 may be coated on an outer surface of a side wall of the first reinforcing structure 230, and then the first reinforcing structure 230 coated with the expansion adhesive 2412 is accommodated in the first cavity 221. A portion of the first beam 220 corresponding to the expansion adhesive 2412 is heated, so that expansion of the expansion adhesive 2412 occurs, to achieve the filling effect and realize interference connection of the first reinforcing structure 230 and the first beam 220. For example, the expansion adhesive 2412 and the first reinforcing structure 230 may fill the first cavity 221 along the X direction and/or the Z direction.

The fixing manner between the first reinforcing structure 230 and the first beam 220 is mainly introduced in the above with reference to the accompanying drawings, and fixing between a first reinforcing structure 230 and a first wall 210 will be described in detail below with reference to the accompanying drawings. Optionally, the first reinforcing structure 230 and the first wall 210 may be fixed in various ways. For example, the first reinforcing structure 230 may be fixed to different positions of the first wall 210 through a second connector 242. The second connector 242 in an embodiment of the present application may include one or more fasteners, and each second connector 242 may include a connecting portion and a head. For example, the second connector 242 may be a bolt, a screw, a rivet, or the like, and the embodiment of the present application is not limited thereto.

Optionally, as an embodiment, the first reinforcing structure 230 may further include a fixing part 232 connected to the insertion part 231, the fixing part 232 is located outside the first cavity 221, and the fixing part 232 is fixed to the first wall 210 through the second connector 242. Specifically, as shown in FIGS. 4 and 5, the fixing part 232 is fixed to a surface of the first wall 210 toward the interior of the housing 11 through the second connector 242, so that the first reinforcing structure 230 is fixed to the first wall 210.

Specifically, as shown in FIGS. 4 and 5, the fixing part 232 may be fixed to an inner sub-wall 211 of the first wall 210, where the inner sub-wall 211 is an inner wall of the housing 11. For example, as shown in FIGS. 4 to 6, the fixing part 232 may be in a thin plate shape, and is fixed to the inner sub-wall 211 of the first wall 210 by one or more second connectors 242. In the figure, the second connector 242 including four bolts is taken as an example, the four bolts sequentially penetrate the fixing part 232 and the inner sub-wall 211 from the inside of the housing 11 toward the outside of the housing 11.

Optionally, in order to further increase the strength and stability between the first reinforcing structure 230 and the first wall 210, as shown in FIGS. 5 and 6, a connector may also be provided on the insertion part 231, for example, the connector may be a fastener such as a bolt, a screw or a rivet, to be configured to fix the first reinforcing structure 230 and the first wall 210. Specifically, as shown in FIG. 5 and FIG. 6, a groove may be provided on any one of the reinforcing blocks included in the first reinforcing structure 230, for example, a groove may be provided on the lowermost reinforcing block 2313, and a through hole may be provided on a bottom wall of the groove, so that the fastener penetrates the bottom wall of the groove and the inner sub-wall 211, thereby realizing fixation between the lowermost reinforcing block 2313 and the inner sub-wall 211.

It should be understood that the size and shape of the fixing part 232 of the first reinforcing structure 230 may be set according to the actual application. For example, as shown in FIGS. 4 to 6, the fixing part 232 may be rectangular, or may also be set in a circular shape or other shapes. In addition, in order not to occupy too much internal space of the housing 11, the fixing part 232 may be set in a thin plate shape. Furthermore, a groove may be provided on the fixing part 232, and the second connector 242 may be provided at a bottom wall of the groove to reduce the occupied internal space of the housing 11.

Figure 8:
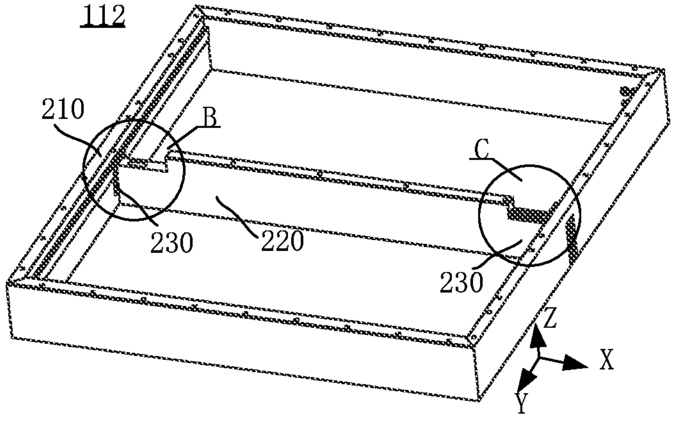
FIG. 8 is a schematic diagram of another housing of a battery disclosed in an embodiment of the present application.

Optionally, as another embodiment, compared with the thin plate-shaped fixing part 232 shown in FIGS. 5 and 6, the fixing part 232 may also have a larger thickness, and the fixing part 232 is provided in the cavity of the first wall 210. Specifically, FIG. 8 shows another schematic diagram of a main body part 112 of a housing 11 according to an embodiment of the present application. Unlike the main body part 112 shown in FIG. 4, a first wall 210 and a first beam 220 of a main body part 112 in FIG. 8 adopt different first reinforcing structures 230. Furthermore, one or more first beams 220 in the main body part 112 and the first wall 210 may correspondingly have a plurality of intersecting positions, and the same first reinforcing structure 230 or different first reinforcing structures 230 may be provided at the plurality of intersecting positions. For example, in FIG. 8, different first reinforcing structures 230 are provided at two intersecting positions of the first beam 220 and the first wall 210, that is, the first reinforcing structures 230 in regions B and C are different. The first reinforcing structure 230 in the left region B will be described first.

Figure 9:
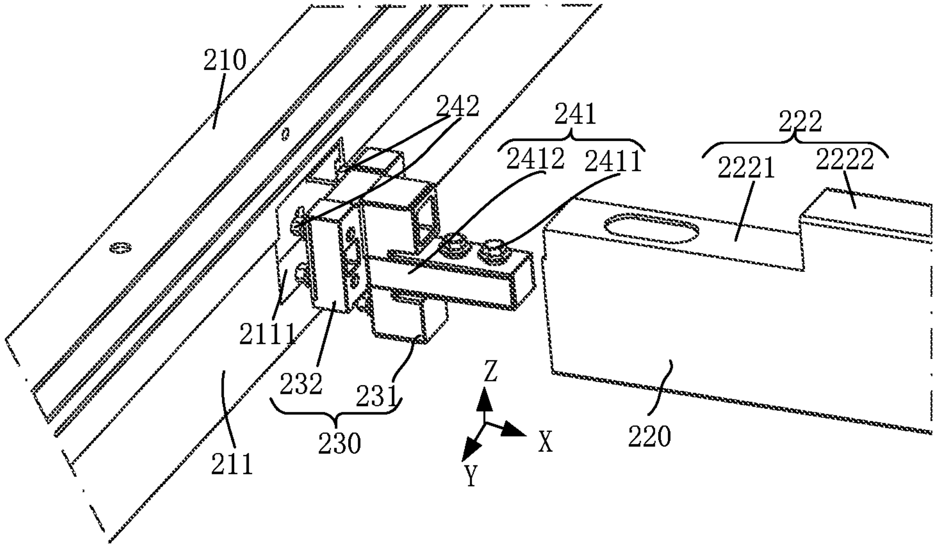
FIG. 9 is a partial exploded diagram of another housing of a battery disclosed in an embodiment of the present application.

FIG. 9 shows an exploded diagram of the region B in FIG. 8. As shown in FIG. 9, a first beam 220 in FIG. 9 corresponds to the first beam 220 in FIG. 5, and is applicable to the description of the first beam 220 in FIG. 5. Furthermore, an insertion part 231 and a first connector 241 in FIG. 9 correspond to the insertion part 231 and the first connector 241 in FIG. 5, respectively, and are applicable to the related descriptions of the insertion part 231 and the first connector 241 in FIG. 5, and they are not described here again for brevity.

Compared with FIG. 5, it can be seen that a fixing part 232 in FIG. 9 is different from the fixing part 232 in FIG. 5. Specifically, as shown in FIG. 9, an inner sub-wall 211 of a first wall 210 has a first opening 2111, and the first opening 2111 is configured to accommodate the fixing part 232 in a cavity of the first wall 210.

Figure 10:
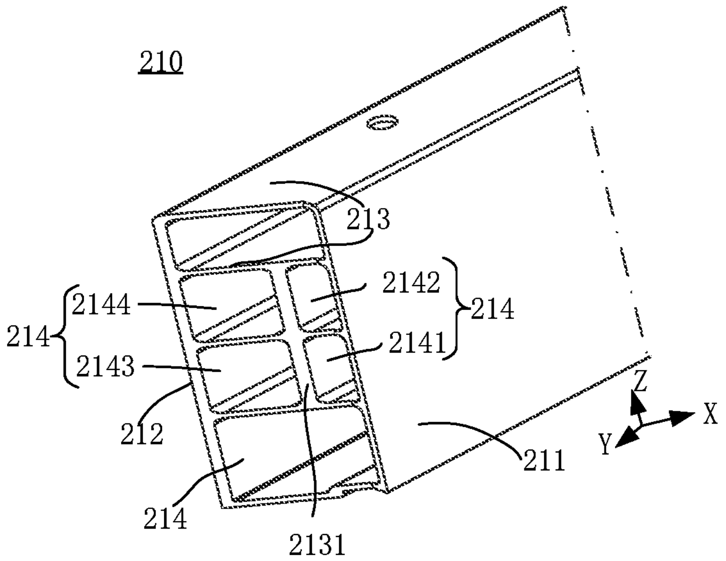
FIG. 10 is a schematic cross-sectional diagram of a first wall disclosed in an embodiment of the present application.

FIG. 10 shows a schematic cross-sectional diagram of a first wall 210, and the section is obtained by cutting the first wall 210 along a plane perpendicular to the first wall 210 or a plane parallel to the first beam 220. In an embodiment of the present application, the first wall 210 being perpendicular to the first beam 220 is taken as an example, a thickness direction of the first wall 210 is the X direction, a height of the first wall 210 is the Z direction, and a length direction of the first wall 210 is the Y direction. As shown in FIGS. 9 and 10, the first wall 210 may include an inner sub-wall 211, an outer sub-wall 212, and a second connecting wall 213 for connecting the inner sub-wall 211 and the outer sub-wall 212. The inner sub-wall 211 is an inner wall of the housing 11, and the outer sub-wall 212 is an outer wall of the housing 11. The inner sub-wall 211, the outer sub-wall 212, and the second connecting wall 213 form one or more second cavities 214 of the first wall 210.

Similar to the first cavity 221 in the first beam 220, the shape, size, position and number of the second cavities 214 may be set according to the actual application, which is not limited by the embodiment of the present application. For example, distribution of the second cavities 214 of the first wall 210 as shown in FIG. 10 is taken as an example here, that is, the second connecting wall 213 includes a part of wall parallel to the inner sub-wall 211 and the outer sub-wall 212, which is referred to as an intermediate wall 2131, so that the second cavities 214 include a row of second cavities 2141 and 2142 close to the inner sub-wall 211, and a row of second cavities 2143 and 2144 close to the outer sub-wall 212.

As shown in FIG. 9 and FIG. 10, the inner sub-wall 211 of the first wall 210 of the embodiment of the present application has a first opening 2111, and the first opening 2111 is configured to accommodate the fixing part 232 in a cavity of the first wall 210, for example, the fixing part 232 is accommodated in the row of second cavities 2141 and 2142 close to the inner sub-wall 211, so that the fixing part 232 is fixed to the intermediate wall 2131 by a second connector 242, thereby realizing the fixation of the first reinforcing structure 230 and the first wall 210.

Figure 11:
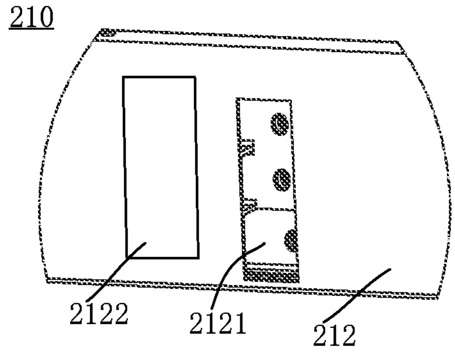
FIG. 11 is a partial schematic diagram of an outer subwall of a first wall disclosed in an embodiment of the present application.

Specifically, an opening may be provided on the outer sub-wall 212 to install and fix the second connector 232, the intermediate wall 2131 and the fixing part 232. Specifically, FIG. 11 shows a partial exploded diagram of an outer sub-wall 212 of a first wall 210. As shown in FIGS. 9 to 11, the outer sub-wall 212 is provided with a second opening 2121, and the second opening 2121 is configured to install the second connector 242, so that the second connector 242 may fix the fixing part 232 and the intermediate wall 2131 through the second opening 2121.

Optionally, as shown in FIG. 11, the first wall 210 may further include a sealing plate 2122, and the sealing plate 2122 is hermetically connected to the second opening 2121, so that the outer sub-wall 212 of the first wall 210 is relatively sealed.

Figure 12:
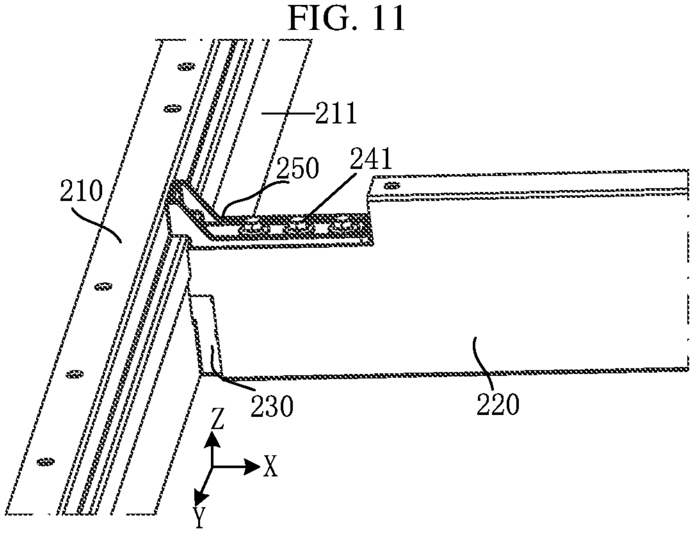
FIG. 12 is a partial schematic diagram of another housing of a battery disclosed in an embodiment of the present application.
Figure 13:
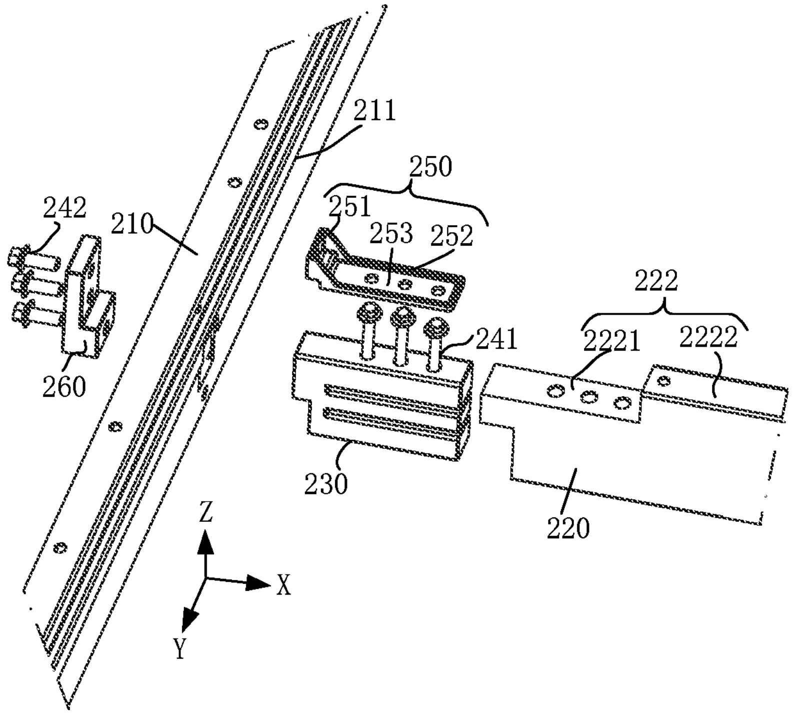
FIG. 13 is another partial exploded diagram of another housing of a battery disclosed in an embodiment of the present application.
Figure 14:
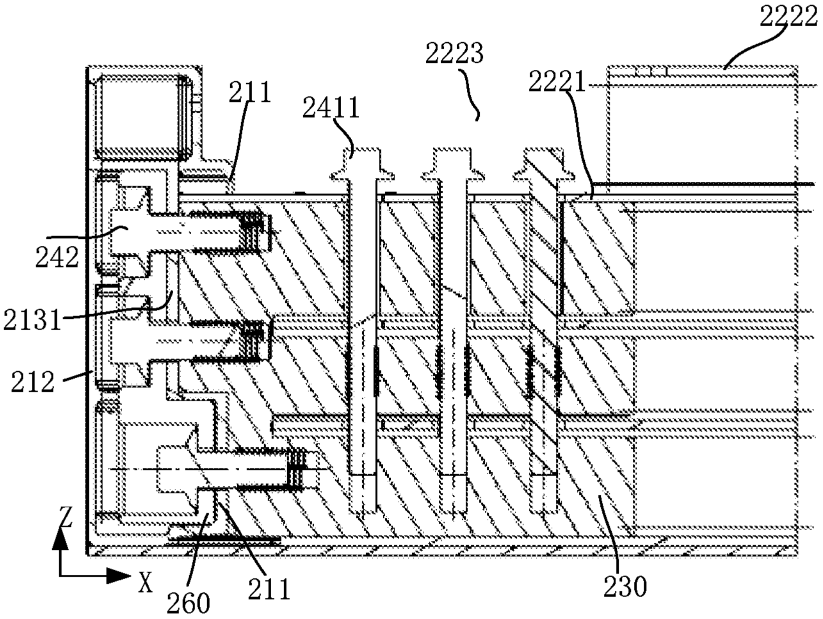
FIG. 14 is a schematic partial cross-sectional diagram of another housing of a battery disclosed in an embodiment of the present application.
Figure 15:
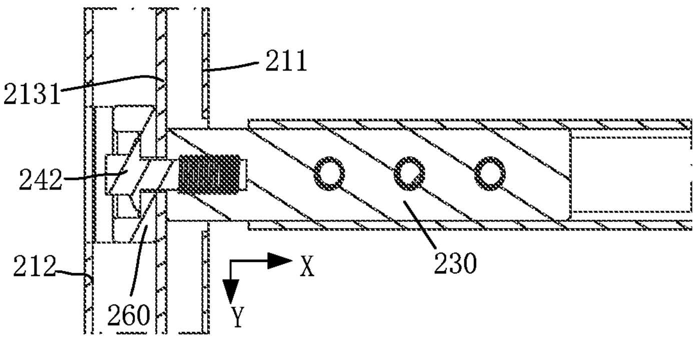
FIG. 15 is another partial schematic cross-sectional diagram of another housing of a battery disclosed in an embodiment of the present application.

Optionally, as yet another example, the first reinforcing structure 230 in the embodiment of the present application may be fixed to the first wall 210 in other manners such as the region C in FIG. 8. FIG. 12 shows an enlarged diagram of the region C in FIG. 8, FIG. 13 is an exploded diagram of FIG. 12, and FIGS. 14 and 15 are cross-sectional diagrams of FIG. 12. The section in FIG. 14 is obtained by cutting the first beam 220 along a plane parallel to the first beam 220, and the section in FIG. 15 is obtained by cutting the first beam 220 along a plane parallel to the bottom wall of the main body 112 (or along a plane perpendicular to both the first wall 210 and the first beam 220). As shown in FIGS. 12 to 15, referring to FIG. 8, the first wall 210 being perpendicular to the first beam 220 is taken as an example, a thickness direction of the first wall 210 or a length direction of the first beam 220 is the X direction, a height direction of the first wall 210 or a height direction of the first beam 220 is the Z direction, and a length direction of the first wall 210 or a thickness direction of the first beam 220 is the Y direction.

As shown in FIGS. 12 to 15, a first beam 220 in FIGS. 12 to 15 corresponds to the first beam 220 in FIG. 5, and is applicable to the related description of the first beam 220 in FIG. 5; meanwhile, a first reinforcing structure 230 in FIGS. 12 to 15 corresponds to the insertion part 231 in FIG. 5, and is applicable to the description of the insertion part 231 in FIG. 5; a first connector 241 in FIGS. 12 to 15 corresponds to the first connector 241 in FIG. 5, and is applicable to the description of the first connector 241 in FIG. 5; and they will not be repeated here for brevity.

For example, similar to FIG. 5, the first reinforcing structure 230 shown in FIGS. 12 to 15 may include a plurality of reinforcing blocks, and one reinforcing block is correspondingly accommodated in one first cavity of the first beam 220. For example, the first reinforcing structure 230 including three reinforcing blocks is taken as an example here, and axes of the three reinforcing blocks are parallel to each other. In addition, lengths of the three reinforcing blocks along the X direction may also be set to be the same or different, and the three reinforcing blocks along the X direction having the same length is taken as an example to describe here.

The first connector 241 in an embodiment of the present application may include a plurality of fasteners 2411, for example, three fasteners 2411 are taken as an example. A plurality of fasteners 2411 may be arranged in the X direction, and each fastener 2411 may be provided in a height direction. For the three reinforcing blocks parallel to each other with the same length as shown in the figure, each fastener 2411 may penetrate at least one reinforcing block from top to bottom. For example, the fastener 2411 penetrating two reinforcing blocks is taken as an example in FIG. 14, and the lowermost reinforcing block is partially penetrated by the fastener 2411.

In addition, as shown in FIGS. 12 to 15, an outer top wall 222 of the first beam 220 may be provided with a stepped structure. Specifically, the outer top wall 222 of the first beam 220 is provided with a stepped structure, and in the stepped structure, a lower surface is a surface 2221, and a higher surface is a surface 2222. The two surfaces with different heights make the outer top wall 222 have a recess 2223, and a head of the fastener 2411 may be located in the recess 2223, that is, the head is provided on the lower surface 2221, so that the head of the fastener 2411 does not exceed a maximum height of the first beam 220 in the height direction of the first beam 220. In this way, the fastener 2411 is not convex in the Z direction, which will not affect the installation of the main body part 112. For example, when the cover part 111 corresponding to the main body part 112 is in a flat plate shape, the fastener 2411 does not protrude in height, which will not affect the closure of the cover part 111 with the main body part 112.

Optionally, in order to reduce deformation caused by stress concentration at a contact portion of the first beam 220 and the first wall 210, a second reinforcing structure 250 may also be provided on the lower surface 2221. Specifically, as shown in FIGS. 12 and 13, the housing 11 further includes a second reinforcing structure 250, and the second reinforcing structure 250 includes a first portion 251 and a second portion 252 that are connected. The first portion 251 is fixed to a surface of the first wall 210 toward the first beam 220, that is, the first portion 251 is fixed to the outer surface of the inner sub-wall 211. The second portion 252 is fixed to the outer top wall 222 of the first beam 220, and the fastener 2411 penetrates the second portion 252. For example, the second portion 252 may be fixed to the lower surface 2221. The second reinforcing structure 250 may reduce the stress concentration at the end that the first beam 220 is in contact with the first wall 210, which may also prevent the first beam 220 from tilting up in the Z direction.

Optionally, the second reinforcing structure 250 may include a groove 253, where a bottom wall of the groove 253 located in the second portion 252 is provided with a through hole for the fastener 2411 to penetrate the second portion 252. In addition, since an outer surface of the inner sub-wall 211 may have some convex or concave region, a shape of a portion where the second reinforcing structure 250 is in contact with the inner sub-wall 211 may be set according to the outer surface of the inner sub-wall 211. For example, as shown in FIG. 12 and FIG. 13, the first portion 251 may have convex and concave regions, so that the first portion 251 may be attached to the outer surface of the inner sub-wall 211, but the embodiment of the present application is not limited thereto.

It should be understood that compared with FIG. 5, the first reinforcing structure 230 in FIGS. 12 to 15 does not include the fixing part 232, but is fixed to the first wall 210 in other manners. Specifically, the housing 11 may further include a third reinforcing structure 260, and the third reinforcing structure 260 is provided in the second cavity 214 of the first wall 210 and is fixed to the first wall 210 and the first reinforcing structure 230 through the second connector 242.

It should be understood that, taking the structure of the first wall 210 as shown in FIGS. 10 and 11 as an example, the third reinforcing structure 260 may be fixed to the intermediate wall 2131. Specifically, the outer sub-wall 212 of the first wall 210 may be provided with a second opening 2121, and the second opening 2121 may be configured to install the second connector 242 and the third reinforcing structure 260, and correspondingly, the first wall 210 also includes a sealing plate 2122, and the sealing plate 2122 is hermetically connected to the second opening 2121. As shown in FIGS. 12 to 15, the third reinforcing structure 260 may be fixed to a surface of the intermediate wall 2131 toward the outer sub-wall 212 through the second opening 2121, and the second connector 242 sequentially penetrates the third reinforcing structure 260 and the intermediate wall 2131 and extends into the first reinforcing structure 230, thereby fixing the third reinforcing structure 260, the first wall 210 and the first reinforcing structure 230.

Optionally, considering that distribution of the second cavities 214 in the first wall 210 may be flexibly set according to the actual application, the shape and installation position of the third reinforcing structure 260 may also be correspondingly adjusted. For example, since there may be at least part of region inside the first wall 210 that does not include the intermediate wall 2131, for example, the lowermost second cavity 214 of the first wall 210 in FIGS. 12 to 15 has a large volume and there is no intermediate wall 2131, at least part of the third reinforcing structure 260 may not be fixed to the intermediate wall 2131, for example, this part may be directly fixed to a surface of the inner sub-wall 211 of the first wall 210 toward the outer sub-wall 212. That is, the third reinforcing structure 260 may be partially fixed to the intermediate wall 2131 and partially fixed to the inner sub-wall 211, then FIG. 16 shows a schematic diagram of a third reinforcing structure 260 according to an embodiment of the present application, and the third reinforcing structure 260 may have a stepped structure as shown in FIG. 16, but the embodiment of the present application is not limited thereto.

In addition, as for a portion of the third reinforcing structure 260 fixed to the intermediate wall 2131, a corresponding region in the first reinforcing structure 230 may be attached to a surface of the intermediate wall 2131 toward the inner sub-wall 211, that is, as shown in FIGS. 12 to 15, the first reinforcing structure 230 has a stepped structure, and at least part of the first reinforcing structure 230 may be accommodated in the second cavity 214, for example, an opening may be provided on the inner sub-wall 211 to accommodate the part of the first reinforcing structure 230 and fix the part of the first reinforcing structure 230 to the surface of the intermediate wall 2131 toward the inner sub-wall 211, but the embodiment of the present application is not limited thereto.

Figure 16:
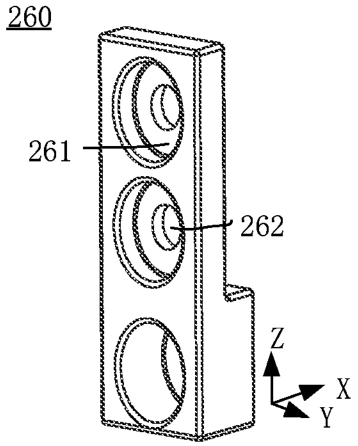
FIG. 16 is a schematic diagram of a third reinforcing structure disclosed in an embodiment of the present application.

Optionally, as shown in FIG. 16, the third reinforcing structure 260 may include one or more grooves 261, and a bottom wall of each groove 261 is provided with a through hole 262 for installing the second connector 242. For example, the second connector 242 may include a fastener having a connecting part and a head, and the connecting part passes through the through hole 262, and the head is provided at the bottom wall of the groove 261.

It should be understood that in an embodiment of the present application, the number of the grooves 261 on the third reinforcing structure 260 may be set according to the number of the second connectors 242. For example, as shown in FIGS. 12 to 16, the second connector 242 may be a bolt, and the number of grooves 261 is equal to the number of bolts.

In addition, the position of the groove 261 in the third reinforcing structure 260 may be set according to the position of the second cavities 214. For example, as shown in FIGS. 12 to 16, one groove 261 corresponds to one second cavity 214, but the embodiment of the present application is not limited thereto.

Therefore, in the housing 11 of the battery of the embodiment of the present application, the first reinforcing structure 230 is provided at an intersection of the first beam 220 and the first wall 210, and the first reinforcing structure 230 is at least partially accommodated in the cavity of the first beam 220 and fixed to the first beam 220 and the first wall 210, respectively, thereby fixing the first beam 220 and the first wall 210, and improving providing the strength of the intersection of the first beam 220 and the first wall 210 without occupying the internal space of the housing 11 or by occupying a very small space, which effectively solves the problem of failure at the intersection of the two under the action of the expansion force.

The housing of the battery, the battery and the power consumption apparatus according to the embodiment of the present application are described above, and a method and apparatus for producing a housing of a battery according to an embodiment of the present application will be described below. For the parts not described in detail, reference may be made to the foregoing embodiments.

Figure 17:
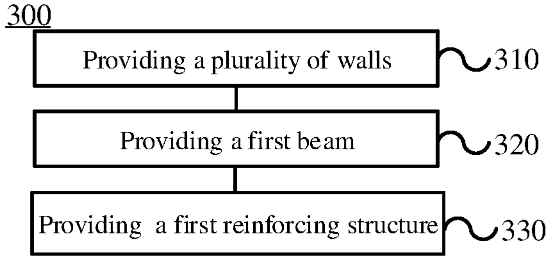
FIG. 17 is a schematic flowchart of a method for producing a housing of a battery disclosed in an embodiment of the present application.

FIG. 17 shows a schematic flowchart of a method 300 for producing a housing of a battery according to an embodiment of the present application. As shown in FIG. 17, the method 300 may include: S310, providing a plurality of walls, the plurality of walls being configured to form an accommodating space of the housing, and the plurality of walls including a first wall; S320, providing a first beam, the first beam being provided in the accommodating space, the first beam intersecting with the first wall, and the first beam having a first cavity inside; and S330, providing a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam.

Optionally, the first connector includes an expansion adhesive, and the method 300 further includes: coating the expansion adhesive on at least part of an outer surface of the first reinforcing structure; and accommodating, in the first cavity, a portion of the first reinforcing structure coated with the expansion adhesive, and heating an accommodated portion, so that the first reinforcing structure is connected to the first beam after expansion of the expansion adhesive occurs.

Figure 18:
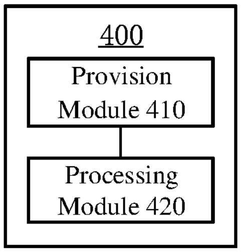
FIG. 18 is a schematic block diagram of an apparatus for producing a housing of a battery disclosed in an embodiment of the present application.

FIG. 18 shows a schematic block diagram of an apparatus 400 for producing a housing of a battery according to an embodiment of the present application. As shown in FIG. 18, the apparatus 400 may include: a provision module 410. The provision module 410 is configured to: provide a plurality of walls, the plurality of walls being configured to form an accommodating space of the housing, and the plurality of walls including a first wall; provide a first beam, the first beam being provided in the accommodating space, the first beam intersecting with the first wall, and the first beam having a first cavity inside; and provide a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam.

Optionally, the first connector includes an expansion adhesive, the apparatus further includes a processing module 420, and the processing module 420 is configured to: coat the expansion adhesive on at least part of an outer surface of the first reinforcing structure; and accommodate, in the first cavity, a portion of the first reinforcing structure coated with the expansion adhesive, and heat an accommodated portion, so that the first reinforcing structure is connected to the first beam after expansion of the expansion adhesive occurs.

Although the present application has been described with reference to exemplary embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A housing of a battery, comprising:

a plurality of walls, configured to form an accommodating space of the housing, the plurality of walls comprising a first wall, wherein the first wall comprises an inner sub-wall, an outer sub-wall, and a second connecting wall for connecting the inner sub-wall and the outer sub-wall, the inner sub-wall is an inner wall of the housing, the outer sub-wall is an outer wall of the housing, and the inner sub-wall, the outer sub-wall, and the second connecting wall form a second cavity of the first wall;

a first beam, provided in the accommodating space, the first beam intersecting with the first wall, and the first beam having a first cavity inside; and a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam, wherein the first reinforcing structure comprises a fixing part and an insertion part, the insertion part is accommodated in the first cavity, the fixing part is located outside the first cavity, and the fixing part is fixed to the first wall through the second connector, so that the first reinforcing structure is fixed to the first wall, the fixing part is accommodated in the second cavity, the inner sub-wall is provided with a first opening, and the first opening is configured to accommodate the fixing part in the second cavity;

wherein the first beam comprises two outer side walls and a first connecting wall connecting the two outer side walls, and the two outer side walls and the first connecting wall form a plurality of first cavities;

the insertion part comprises a plurality of reinforcing blocks, the first connector comprises a fastener, the fastener comprises a connecting part and a head, the connecting part of the fastener penetrates at least one of the plurality of reinforcing blocks in a second direction, and the second direction is a height direction of the first beam.

2. The housing according to claim 1, wherein each of the plurality of reinforcing blocks is accommodated in a corresponding first cavity of the plurality of first cavities.

3. The housing according to claim 1, wherein the first connector comprises a plurality of fasteners arranged in a first direction, and the first direction is a length direction of the first beam.

4. The housing according to claim 3, wherein the housing further comprises a second reinforcing structure, the second reinforcing structure comprises a first portion and a second portion that are connected, the first portion is fixed to a surface of the first wall toward the first beam, the second portion is fixed to the outer top wall of the first beam, and the fastener penetrates the second portion.

5. The housing according to claim 1, wherein a recess is provided on an outer top wall of the first beam, and the head of the fastener is located in the recess, so that the head of the fastener does not exceed a maximum height of the first beam in the height direction of the first beam.

6. The housing according to claim 1, wherein the first connector further comprises an expansion adhesive, and the expansion adhesive is located between the first reinforcing structure and the first beam, to connect the first reinforcing structure and the first beam.

7. The housing according to claim 1, wherein the housing further comprises:

a third reinforcing structure, provided in the second cavity, the third reinforcing structure being fixed to the first wall and the first reinforcing structure through the second connector.

8. The housing according to claim 7, wherein the outer sub-wall is provided with a second opening, and the second opening is configured to install the second connector.

9. The housing according to claim 8, wherein the first wall further comprises a sealing plate, and the sealing plate is hermetically connected to the second opening.

10. The housing according to claim 1, wherein the housing comprises a main body part and a cover part, the main body part is a hollow structure with an opening at one end, and the cover part is configured to cover the opening of the main body part to form a closed chamber, and the first wall is any wall of the main body part.

11. A battery, comprising:

a plurality of battery cells; and the housing according to claim 1, wherein the plurality of battery cells are accommodated in the housing.

12. A power consumption apparatus, comprising the battery according to claim 11, the battery being configured to provide electric energy.

13. A method for producing a housing of a battery, comprising:

providing a plurality of walls, the plurality of walls being configured to form an accommodating space of the housing, and the plurality of walls comprising a first wall, wherein the first wall comprises an inner sub-wall, an outer sub-wall, and a second connecting wall for connecting the inner sub-wall and the outer sub-wall, the inner sub-wall is an inner wall of the housing, the outer sub-wall is an outer wall of the housing, and the inner sub-wall, the outer sub-wall, and the second connecting wall form a second cavity of the first wall;

providing a first beam, the first beam being provided in the accommodating space, the first beam intersecting with the first wall, and the first beam having a first cavity inside; and providing a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam, wherein the first reinforcing structure comprises a fixing part and an insertion part, the insertion part is accommodated in the first cavity, the fixing part is located outside the first cavity, and the fixing part is fixed to the first wall through the second connector, so that the first reinforcing structure is fixed to the first wall, the fixing part is accommodated in the second cavity, the inner sub-wall is provided with a first opening, and the first opening is configured to accommodate the fixing part in the second cavity;

wherein the first beam comprises two outer side walls and a first connecting wall connecting the two outer side walls, and the two outer side walls and the first connecting wall form a plurality of first cavities;

the insertion part comprises a plurality of reinforcing blocks, the first connector comprises a fastener, the fastener comprises a connecting part and a head, the connecting part of the fastener penetrates at least one of the plurality of reinforcing blocks in a second direction, and the second direction is a height direction of the first beam.

14. An apparatus for producing a housing of a battery, comprising: a provision module, the provision module being configured to:

provide a plurality of walls, the plurality of walls being configured to form an accommodating space of the housing, and the plurality of walls comprising a first wall, wherein the first wall comprises an inner sub-wall, an outer sub-wall, and a second connecting wall for connecting the inner sub-wall and the outer sub-wall, the inner sub-wall is an inner wall of the housing, the outer sub-wall is an outer wall of the housing, and the inner sub-wall, the outer sub-wall, and the second connecting wall form a second cavity of the first wall;

provide a first beam, the first beam being provided in the accommodating space, the first beam intersecting with the first wall, and the first beam having a first cavity inside; and provide a first reinforcing structure, at least part of the first reinforcing structure being accommodated in the first cavity, and the first reinforcing structure being respectively fixed to the first beam and the first wall through a first connector and a second connector, so that the first wall is fixedly connected to the first beam, wherein the first reinforcing structure comprises a fixing part and an insertion part, the insertion part is accommodated in the first cavity, the fixing part is located outside the first cavity, and the fixing part is fixed to the first wall through the second connector, so that the first reinforcing structure is fixed to the first wall, the fixing part is accommodated in the second cavity, the inner sub-wall is provided with a first opening, and the first opening is configured to accommodate the fixing part in the second cavity;

wherein the first beam comprises two outer side walls and a first connecting wall connecting the two outer side walls, and the two outer side walls and the first connecting wall form a plurality of first cavities;

the insertion part comprises a plurality of reinforcing blocks, the first connector comprises a fastener, the fastener comprises a connecting part and a head, the connecting part of the fastener penetrates at least one of the plurality of reinforcing blocks in a second direction, and the second direction is a height direction of the first beam.

15. The housing according to claim 1, wherein the second connecting wall includes an intermediate wall parallel to the inner sub-wall and the outer sub-wall, the intermediate wall is located between the inner sub-wall and the outer sub-wall, the first opening is configured to accommodate the fixing part in the second cavity between the intermediate wall and the inner sub-wall, so that the second connector can fix the fixing part to the intermediate wall.

* * * * *